UNITED STATES PATENT OFFICE 2,341,581

PREPARATION OF DRILLING MUDS

Charles F. Teichmann, Beaumont, Tex., assignor, by mesne assignments, to The Texas Company, New York, N. Y., a corporation of Delaware No Drawing. Application February 24, 1937, Serial No. 127,408

16 Claims. (Cl. 252—8.5)

This invention relates to drilling muds and more particularly to the preparation of drilling muds employed in the drilling of wells.

More specifically my invention relates to a method of controlling the colloidal and physical properties of a drilling mud so as to maintain it in the most desirable condition for use and which comprises adding to the drilling mud a water soluble compound containing the thiotetraphosphate radical.

Drilling muds are almost universally used in the drilling of wells employed for tapping underground collections of oil, gases, brines, and water. These muds fulfill various functions, the most important of which are to assist in the removal of cuttings from the wells, to seal off gas pockets which may be encountered at various levels, and to lubricate the drilling tools and the drill pipes which carry the tools.

Drilling muds are essentially mixtures of finely-divided solids such as clay with water, usually so compounded that they weigh from eight to twelve pounds per gallon. Whenever it is found necessary to increase the specific gravity of a particular mud, it is customary to add thereto finely-divided materials which have a high specific gravity such as barytes, litharge and the like.

An ideal drilling mud is one which is thixotropic, that is to say, a fluid which, on agitation by pumping or otherwise, has a relatively low viscosity and is free-flowing but, when agitation is stopped, gradually sets or gels. This gelling action is sufficiently slow to permit the cuttings to settle two or three feet before the gel structure is strong enough to support them. When such a drilling mud is circulated through a well, it picks up the cuttings and carries them to the surface and there, upon settling in a settling pit, the cuttings settle out, leaving a substantially cuttings-free mud.

The use of a drilling mud, which is not thixotropic, is attended by many disadvantages, the more important of which will be discussed briefly. A non-thixotropic drilling mud is difficult to pump and does not allow proper and complete settling of the cuttings in the settling pits where the mud is in a relatively quiescent state. Furthermore, it will be observed that it clings to the drill pipe and the drilling tools and thus exerts an appreciable braking action. In addition to these undesirable properties, it has been observed that the use of a non-thixotropic drilling mud may cause gas blowouts where the well traverses strata containing gases under high pressure. When drilling through such strata, the hydrostatic head of the drilling mud serves normally to more than counterbalance the gas pressure. During the drilling operations, when it becomes necessary to withdraw the drill pipe and the drilling tools, the non-thixotropic drilling mud will cling thereto. In this manner the balance that has existed between the hydrostatic head of the drilling mud and the gas pressure is disturbed and, if the gas pressure is higher than the lessened hydrostatic head of the drilling mud, a gas blowout occurs.

Drilling muds consist essentially of colloidal dispersions of clay in water. When this is considered, in conjunction with the further fact that the thixotropic character of a drilling mud is a function of its colloidal condition, it becomes obvious that the clay particles, having a size within the colloidal particle size range, determine largely the thixotropic character of a drilling mud. The aforementioned colloidal particles of clay are essentially acids whose anion is a micell of the general formula

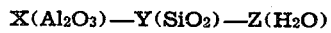

$$X(Al_2O_3)-Y(SiO_2)-Z(H_2O)$$

where X is approximately 1, Y is approximately 3, and Z may vary over wide values.

In the interests of simplicity, the aforementioned anion will be termed hereinafter as clay and the compounds formed by its combination with various cations will be termed clays of such cations; so, for example, the hydrogen compound will be termed hydrogen clay or acid clay, the sodium compound will be termed sodium clay, while the calcium compound will be called calcium clay. For purposes of this discussion, we consider three types of clays, acid clays, clays of monovalent ions such as sodium and potassium clays and multivalent clays such as calcium or magnesium clays.

It has been observed that dispersions in water of either acid clays or multivalent ion clays are non-thixotropic in that they gel with great rapidity and are usually in a coagulated state. Obviously such types of dispersions are useless as drilling muds.

The deterioration of thixotropic drilling muds may involve the conversion of a monovalent clay into an acid clay or a multivalent ion clay. The former occurs when the thixotropic drilling mud encounters acid strata whereby the hydrogen ions of the strata displace the desirable monovalent ions of the clay, resulting in the formation of an acid clay. The latter type of deterioration, which is much more common, results when a drilling mud encounters strata of calcium and magnesium compounds. Under such circumstances, the phenomenon, known as base exchange, occurs whereby the monovalent ion clays of the thixotropic drilling mud are converted into multivalent ion clays.

Although I have described the deterioration of drilling muds due to the conversion of monovalent ion clays into polyvalent clays or due to the formation of hydrogen clays there are other methods whereby a trixotropic drilling mud may be rendered useless for its intended purpose. This may include coagulation by various coagulants or flocculants which may increase both the viscosity of the drilling mud as well as its gel strength to undesirably high values.

I have discovered that water-soluble thiotetraphosphate compounds will not only restore or convert a non-thixotropic drilling mud to the thixotropic state but will serve to maintain it in that state. I do not believe that the effectiveness of the thiotetraphosphate radical is due solely to the fact that it forms water-soluble substantially unionized complexes with calcium and magnesium ions, because the calcium and magnesium compounds of thiotetraphosphoric acid are also effective.

The thiotetraphosphate compounds are salts of the thiotetraphosphoric acids which correspond to tetraphosphoric acid, $Na_6P_4O_{13}$, in which the oxygen atoms have been replaced in whole or in part by sulfur atoms. So, for example, monothiotetraphosphate of sodium has the formula $Na_6P_4O_{12}S$. Similarly trithiotetraphosphate of sodium has the formula $Na_6P_4O_{10}S_3$. In order that those skilled in the art may know exactly the compounds I contemplate using, I give herewith a list of the sodium salts of the various thiotetraphosphoric acids:

$Na_6P_4O_{12}S$        $Na_6P_4O_5S_8$
$Na_6P_4O_{11}S_2$      $Na_6P_4O_4S_9$
$Na_6P_4O_{10}S_3$      $Na_6P_4O_3S_{10}$
$Na_6P_4O_9S_4$         $Na_6P_4O_2S_{11}$
$Na_6P_4O_8S_5$         $Na_6P_4OS_{12}$
$Na_6P_4O_7S_6$         $Na_6P_4S_{13}$
$Na_6P_4O_6S_7$

I have found sodium trithiotetraphosphate, $Na_6P_4O_{10}S_3$, to be well adapted to the practice of my invention. This compound can be prepared by interacting the equivalent of two molecules of phosphorus pentoxide with the equivalent of three molecules of sodium sulfide in accordance with the equation—

$$3Na_2S + 2P_2O_5 \rightarrow Na_6P_4O_{10}S_3$$

this reaction being carried out at an elevated temperature. It is to be understood that there are other methods of preparing the thiotetraphosphate compounds as by the fusion of sodium metaphosphate with sodium sulfide.

In order that those skilled in the art may more readily appreciate the particular effectiveness of the thiotetraphosphate compounds I give herewith several examples of the practice of my invention in which sodium trithiotetraphosphate was used for restoring the thixotropic character of drilling muds which had deteriorated. In these examples the viscosities are expressed as centipoises and were obtained by measurement on the Stormer Viscosimeter at a velocity of 600 revolutions per minute. Since the drilling muds were found to have the proper gel strengths after treatment only the viscosity measurements are given in the examples for the reason that the reductions in viscosity are true indices of the effectiveness of the sodium trithiotetraphosphate.

Example 1

A drilling mud having a viscosity of 29 centipoises was treated with approximately 0.008% by weight of sodium trithiotetraphosphate. It was found that the viscosity of the mud was reduced to a value of 16 centipoises. The use of approximately 0.025% by weight of the salt reduced the viscosity of the mud to a value of 13.5 centipoises.

Example 2

A drilling mud consisting of dispersed shale in water and having a viscosity of 32 centipoises was reduced to 22 centipoises by the use of 0.017% by weight of sodium trithiotetraphosphate. The use of 0.033% by weight of the salt reduced the viscosity to 20 centipoises.

Example 3

A drilling mud consisting of a dispersion of shale in water and contaminated with calcium chloride had a viscosity of 42 centipoises. It was reduced in viscosity to 18 centipoises by the addition thereto of 0.058% by weight of sodium trithiotetraphosphate.

Although I have described the use of sodium trithio-tetraphosphate in the above examples I do not intend to limit myself to that compound alone but contemplate the use of any water soluble compound of thiotetraphosphoric acid or any water soluble agent containing the thiotetraphosphate radical. This may include the thiotetraphosphates of the alkali metals such as sodium, potassium, lithium, and ammonium, as well as mixtures thereof. I also propose to use the calcium, magnesium and other water soluble alkaline earth salts or salts of mixed bases such as for example the sodium calcium complex or the potassium magnesium complex. The only limitation that I impose in the selection of the thiotetraphosphate compounds is that they be sufficiently water soluble to be effective and that they contain the thiotetraphosphate radical.

The amounts of the foregoing salts or compounds necessary to practice my invention depend upon numerous factors such as the type of drilling mud to be treated, the amount of improvement or the degree of protection that is desired in the drilling mud, as well as the conditions of use. Those skilled in the art will appreciate that in view of the foregoing it is impossible to set any specific limitations as to the amounts of the thiotetraphosphate necessary and although I have found that 0.001% to 0.1% by weight of the thiotetraphosphate salts or compounds will usually be sufficient I do not intend to limit myself to that range but contemplate the use of the thiotetraphosphate salts or compounds in amounts sufficient to convert non-thixotropic drilling muds into the thixotropic state or to maintain thixotropic drilling muds in that state.

My invention may be carried out in several different ways. For example, I may prepare a thixotropic drilling mud which is substantially immune to deterioration by base exchange by forming a dispersion of a suitable monovalent ion clay in water and adding to the so-formed drilling mud a quantity of water soluble thiotetraphosphate sufficient to maintain the viscosity of the mud relatively constant during use. I also contemplate the continuous addition of thiotetraphosphate compounds to a drilling mud during use to maintain it in the proper condition.

My invention may also be employed for converting drilling muds which have been deteriorated by base exchange or by flocculation into non-thixotropic drilling muds, and I accomplish this result by adding to the deteriorated drilling mud a sufficient quantity of a thiotetraphosphate compound to restore it to a thixotropic state.

I appreciate that dispersions of certain clays in water may be particularly valuable as drilling muds if they are maintained in an alkaline state, preferably at a pH value in the neighborhood of from 8.0 to 11.5. I contemplate the employment of water soluble thiotetraphosphate compounds in the preparation of such drilling muds and the use in conjunction with the thiotetraphosphate compounds of buffer salts or buffer salt mixtures adapted to maintain the drilling muds at the desired degree of alkalinity. I do not intend to limit myself to any particular group of buffer salts or buffer salt mixtures but intend the use of any which are compatible with the water soluble thiotetraphosphates. These may include the alkali metal salts of weak organic or mineral acids, as sodium carbonate, disodium phosphate, sodium tannate or the like, or balanced mixtures of alkali metal hydroxides such as sodium, potassium, and lithium hydroxides, or similar hydroxides with the alkali metal salts of such acids as boric, phosphoric, carbonic, oxalic, silicic, tannic, gallic, and similar weak acids.

Although the water soluble compounds of thiotetraphosphoric acids display some of the properties of active protective colloids I contemplate the use of the water soluble thiotetraphosphates with protective colloids or the use of the water soluble thiotetraphosphates with both buffer salts or buffer salt mixtures and protective colloids.

In order that those skilled in the art may be apprised of the full extent of my invention I intend that the word "clay" as used herein include bentonite, clays containing appreciable quantities of bentonite, as well as those clays which display the properties of deflocculating in water. I also intend that the term "finely-divided solids" include both clays and all other finely-divided water insoluble solids including materials such as iron oxide, barytes, litharge and the like or any mixtures thereof.

Obviously many modifications and variations of the invention as hereinbefore set forth may be made without departing from the spirit and scope thereof and only such limitations should be imposed as are indicated in the appended claims.

I claim:

1. A drilling mud comprising a finely-divided solid, water and a water soluble salt of a thiotetraphosphoric acid.

2. A drilling mud comprising a finely-divided solid, water and an alkali metal thiotetraphosphate.

3. A drilling mud comprising clay, water and a water soluble salt of a thiotetraphosphoric acid.

4. A drilling mud comprising clay, water and an alkali metal thiotetraphosphate.

5. A drilling mud comprising clay, water and a water soluble salt of a thiotetraphosphoric acid in an amount sufficient to render the drilling mud substantially immune to deterioration by base exchange.

6. A drilling mud in the form of an alkaline thixotropic dispersion comprising clay, water, an alkali metal thiotetraphosphate and a buffer salt adapted to maintain the dispersion in an alkaline state.

7. A drilling mud in the form of an alkaline thixotropic dispersion comprising clay, water, an alkali metal thiotetraphosphate, a lyophile colloid, and a buffer salt adapted to maintain the dispersion in an alkaline state.

8. A drilling mud comprising a finely divided solid, water and sodium trithiotetraphosphate.

9. A drilling mud comprising a finely-divided solid, water and a sodium thiotetraphosphate.

10. A drilling mud comprising a finely-divided solid, water and a lithium thiotetraphosphate.

11. A drilling mud comprising clay, water and lithium trithiotetraphosphate.

12. A drilling mud comprising clay, water and from 0.001 to 0.1% by weight of an alkali metal trithiotetraphosphate.

13. In the art of drilling and controlling wells in which mud is circulated in the bore hole, the process of reducing the viscosity of the mud comprising treating the mud with a water soluble salt of thiotetraphosphoric acid.

14. In the art of drilling and controlling wells in which an aqueous drilling mud is circulated in the bore hole, the process of reducing the viscosity of the mud comprising treating the mud with a water soluble agent containing the reactive thiotetraphosphate radical.

15. A method of maintaining the thixotropic character of a drilling mud containing clay which comprises adding thereto a water soluble salt of a thiotetraphosphoric acid.

16. A method of maintaining the thixotropic character of a drilling mud containing clay which comprises adding thereto an alkali metal thiotetraphosphate.

CHARLES F. TEICHMANN.